Figure 1:
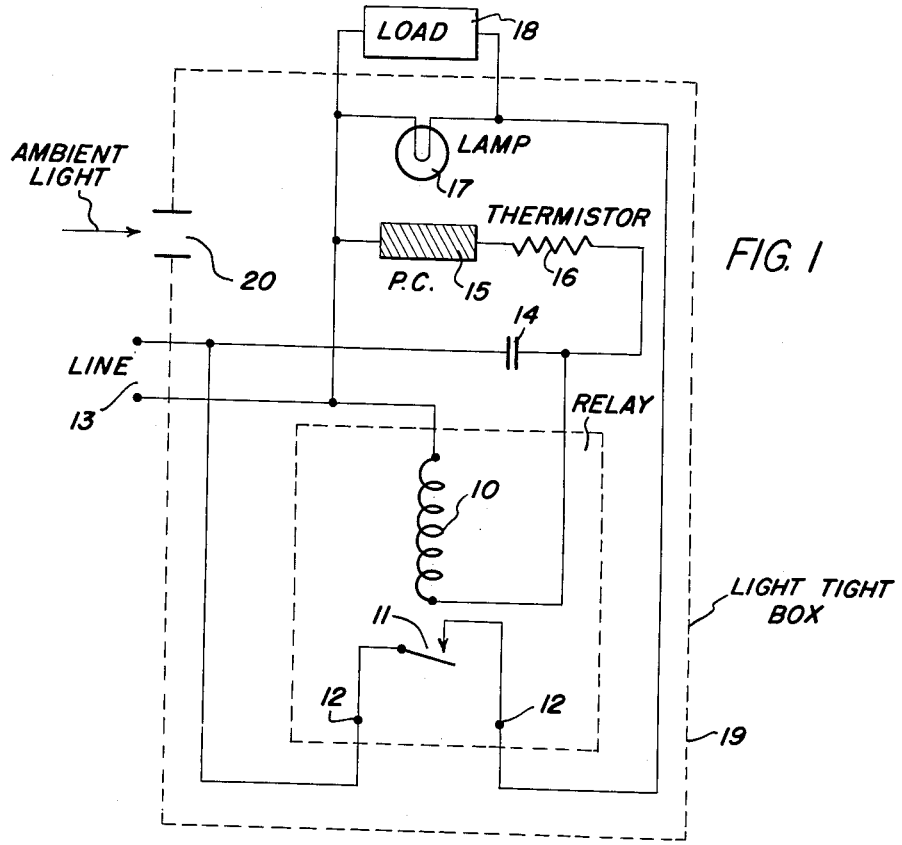

April 4, 1961

I. L. MITCHELL ET AL 2,978,588

FLASHER SYSTEM

Filed Nov. 6, 1959

IRVING L. MITCHELL
SIDNEY S. PRESSMAN
INVENTORS

BY Kurath & Rose

ATTORNEYS

United States Patent Office

2,978,588
Patented Apr. 4, 1961

2,978,588

FLASHER SYSTEM

Irving L. Mitchell, Rockville Centre, and Sidney S. Pressman, Brooklyn, N.Y., assignors to Ebert Electronics Corporation, Queens Village, N.Y., a corporation of New York Filed Nov. 6, 1959, Ser. No. 851,898

15 Claims. (Cl. 250—215)

The present invention relates generally to automatically periodic switching circuits, and more particularly to automatically periodically operating relay controlled switching circuits which require no unilateral control devices for their operation.

Systems for periodically connecting and disconnecting a load circuit to and from a source of electrical power are well known and find wide application. In particular, the load circuit may consist of electric lamps, which are turned on and off in sequence by the switching system, the system then being known as a "flasher" system. In flasher systems, and other periodic switching systems, known to the art heretofore, unilateral control devices have commonly been employed to effect controlled operation of switches, or the switches have been actuated by motors or other mechanical timing devices. Systems employing unilateral control devices, such as vacuum tubes, thyratrons, or transistors, lack the requisite reliability where the system must operate without supervision over extremely long time periods. They are, moreover, relatively expensive, and their timing cycles tend to vary with aging of the unilateral control devices and other circuit components associated with the latter. Motor control devices, on the other hand, tend to be relatively expensive, and are subject to wear and require maintenance, so that their utilization in unattended or unsupervised installations designed for automatic operation over long periods of time is inadvisable. In the case of some flasher systems, moreover, it is usually desired to initiate operation of the flasher system only when ambient light intensity is low, i.e., at night or on approach of nightfall, and automatically to interrupt the operation during daylight, or when ambient light levels are high. It is further desirable that such flasher systems operate at the same periodicity, regardless of the presence of transient light flashes which may originate in lightning, the headlamps of passing vehicles, or the like.

It is a feature of the present invention to provide a flasher system, which maintains its periodicity of flashing regardless of transient stimuli, which may be set into operation in response to a steady and sufficient decrease of ambient light level, and which requires no unilateral control devices or mechanical motor devices in its operation.

It is a further feature of the present invention to provide a periodically operating switch, which requires no mechanical motive power or unilateral control devices, and which has extremely long life and is not subject to a high degree of maintenance, and which can be fabricated extremely economically and in a package of very small size.

Briefly describing a preferred embodiment of the present invention, a relay coil is connected in series with a condenser, with which it resonates or nearly resonates at the operating frequency of the system. The system is designed and intended primarily for energization from power lines having an exemplary frequency of 60 c.p.s. Since the system comprising the capacitor and the relay coil are series resonant, or nearly so, at the power frequency, heavy current flows in the relay coil, i.e., the total impedance of the series circuit is the effective value of the coil resistance taking account of iron losses. Should a relay be utlized which has unduly low resistance, a protective resistance may be connected in series therewith, but the normal relay will be found to have adequate resistance for the purpose. An activating element is connected to the series resonant circuit, which in a preferred embodiment of the invention includes a photo-conductive cell. The photo-conductive cell may be connected either across the relay coil or across the tuning condenser. In the absence of light the photo-conductive cell has an extremely high resistance, and accordingly does not affect the series circuit consisting of the tuning condenser and the relay coil. However, when the photo-conductive cell is illuminated, the Q of the series resonant circuit in which it is connected is reduced, and the reduction may be quite radical. Accordingly, the total voltage across the relay coil, which is higher than line voltage under resonant conditions may be reduced by reduction of the Q of the circuit to a comparatively low value, so that the relay coil transfers its contacts from one state to another.

In the presently described embodiment of our invention, the relay contacts are normally open when the relay coil is de-energized or operating on reduced current, and the contacts are closed when the current in the relay coil increases to a sufficiently high level. The relay contacts are connected in series with a lamp or other convenient source of illumination across the power line. In accordance with a modification of the invention, the system is caused to operate with extraneously added delay in both opening and closing, the delay being incurred by reason of inclusion of a thermistor in series with the photo-conductive element.

The operation of the system, briefly described, involves the fact that the lamp is illuminated whenever the relay is energized, but that illumination of the lamp reduces the resistance of the photo-conductive cell sufficiently to cause the relay to become de-energized. Following through a cycle of operations, and assuming that the lamp is initially unilluminated, the photo-conductive cell will have high resistance, and the resonant circuit consisting of the turning capacitor; the relay coil will then permit heavy current flow through the relay coil. The latter will pull up its contacts, energizing the lamp. Energization of the lamp effects detuning or reduction of Q of the resonant circuit, which in turn permits the contacts to open and to de-energize the lamp circuit. Deenergization of the lamp circuit effects increase of Q of the relay circuit or re-tuning thereof, which is followed by reenergization of the lamp circuit. Accordingly, the cycle of operation is self-perpetuating, and the period of operations is determined by the delays inherent in the system. These delays may, as has been explained hereinabove, be interposed in terms of relay structure, i.e., a relay may be utilized which has an inherent delay, either on opening or closing or both, or the delay may be effected electrically in terms of the control circuitry. In the latter case, we prefer to utilize a thermistor in series with the photo-conductive cell. The thermistor employed has a negative temperature coefficient of resistance, so that its resistance is normally high. Thermistors are known to require considerable time to change resistance upon application of heating current thereto. Accordingly, in the present case, when the photo-conductive cell has become illuminated, substantially total line voltage is applied to the thermistor, which commences to heat. As it heats, its resistance decreases. When its resistance has decreased sufficiently, and only then, does the relay circuit reduce its Q sufficiently to break the energizing circuit for the illuminating source or the lamp. Once the lamp has become de-energized, the photo-conductive cell immediately becomes a high resistance device, and since it is in series with a thermistor the heating current to the thermistor is reduced to a low value. The thermistor then proceeds to cool and as it cools, its resistance increases. The cooling time of the thermistor, however, does not effect the timing cycle of the system, since while the thermistor is cooling the photo-conductive cell interposes high resistance across the relay coil, in any event, so that the resistance of the thermistor is immaterial.

Effect of the photo-conductive cell on the Q of the circuit is enhanced so far as the current drawn by the relay is concerned, by the fact that the photo-conductive element shunts the relay coil. The shunting effect is negligible when the photo-conductive cell is unilluminated, but becomes considerable when the photo-conductive cell is illuminated. Nevertheless, the photo-conductive cell is not required to pass relay currents, so that a heavy relay may be operated by means of the present circuit in response to a photo-conductive cell which is small and of low cost. Furthermore, the life of the photo-conductive cell is lengthened by the fact that it is not required to carry heavy currents.

As an alternative construction, the photo-conductive element may be connected across the tuning condenser instead of across the relay, in which case illumination of the photo-conductive element changes the Q of the resonant circuit, and thereby is enabled to control operation of the relay. However, the total effect, in the latter case, is smaller than when the photo-conductive element is connected directly across the relay because the shunting effect is lost.

A load circuit for the present system, which may consist of flasher lamps, may be connected in any desired relation to the relay contacts. Specifically, a connection across the power source utilized by the relay itself, in series with the relay contacts, is satisfactory.

The system as above described may be included in a light-tight enclosure, if it is desired that operation of the system be independent of ambient light conditions. If the photo-cell is exposed to ambient light conditions, the system will be inoperative so long as ambient light intensity is high, since the relay will then remain unenergized, and its contacts open. Upon attainment of sufficiently low ambient light levels, operation of the system will be initiated and cycling will then occur in response to periodic energization of the local light source, which will operate precisely as if in a light-tight enclosure, since exposure of the photo-cell to darkness is equivalent to enclosing the photo-cell in a light-tight enclosure.

It is accordingly a broad object of the present invention to provide a novel periodically operating relay system requiring no unilateral control devices in its operation.

It is a further object of the present invention to provide a novel periodically operating relay system in which the relay coil is contained in a series resonant circuit, and in which a variable impedance is associated with the series resonant circuit in such fashion as to reduce the Q value of the resonant circuit, upon change of value of the impedance element, sufficiently to change the operating state of the relay, and in which each change of operating state of the relay effects a change of value of the variable impedance in such sense as to reverse the operating state of the relay.

It is another object of the present invention to provide a system for operating flasher lamps at equal periods, by means of circuitry involving no unilateral control devices or mechanical devices, other than the relay itself, the system being economical to fabricate, reliable in its operation, and subject to minimum maintenance.

Still another object of the present invention is to provide a periodically operating relay system employing a relay coil in series with a tuning condenser, which series resonates with the inductance of the relay coil, the relay coil being shunted by a photo-conductive element which controls current flow in the relay coil as a function of light intensity impinging on the photo-conductive element, and in which light for illuminating the photo-conductive element is provided by a light source which is controllably energized by the relay itself.

Figure 2:
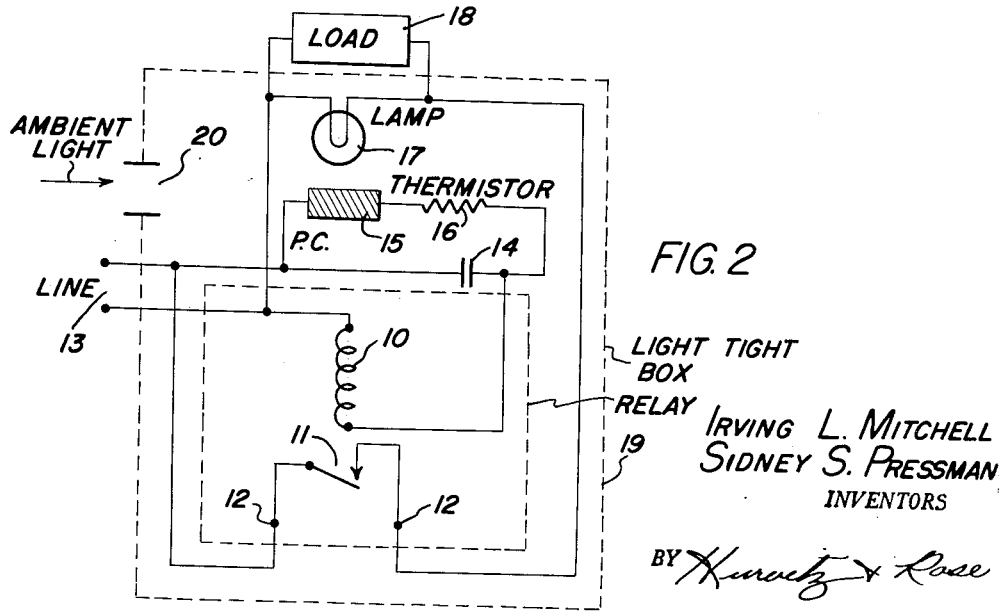

The above and still further objects, features and advantages of the present invention will become apparent upon consideration of the following detailed description of one specific embodiment thereof, especially when taken in conjunction with the accompanying drawings, wherein:

Figure 1 is a schematic circuit diagram of an automatic relay cycling circuit in accordance with the present invention; and Figure 2 is a schematic circuit diagram of a modification of the system of Figure 1.

Referring now more particularly to the accompanying drawings, the reference numeral 10 denotes a relay coil, associated with the relay contacts 11, which are in series with relay output terminals 12. A source of line voltage 13 is provided, which in a preferred embodiment of the invention may be a 60 c.p.s. power line. The terminals 13 are connected across the coil 10 via a tuning capacitor 14 which has a value such as to resonate with the inductance of the coil 10 at the frequency of the line 13. It follows that the total current flowing to the relay 10 will be greater than would be the case in the absence of the condenser 14, and that the voltage across the coil 10 will be greater than line voltage available at the terminals 13, by a factor equal to the Q of the resonant circuit comprising the coil 10 and the condenser 14. The Q of this resonant circuit is primarily determined by the resistance of the coil 10 and by the reactance thereof, and more accurately in terms of the ratio of resistance to inductive reactance at the operating frequency of the coil 10.

Connected directly across the coil is a photo-conductive cell 15, in series with a thermistor 16, inclusion of the latter being an optional feature. The contacts 11 are arranged to be open, when the coil 10 carries no current, or less than a predetermined current necessary for actuating the relay contacts 11, and to be closed when adequate current flows in the relay coil 10. Accordingly, when the circuit comprising condenser 14 and relay coil 10 is resonant, and high value of current flows in the coil 10, the contacts 11 will be closed. By reason of the photo-conductive device 15 (and the thermistor 16) connected in shunt to the coil 10, the Q of the resonant circuit comprising capacitor 14 and relay coil 10 may be controlled. Initially we may assume that the thermistor 16 is removed from the circuit, as may be the case in a practical embodiment of the invention. In such case the resistance of photo-conductive cell 15 determines the total resistance connected in shunt to the relay coil 10. While the photo-conductive cell 15 is unilluminated, its resistance is extremely high, and its effect on the series resonant circuit is accordingly negligible. When, however, the photo-conductive element is sufficiently illuminated, the resistance across the coil 10 becomes relatively small. In such case, the phase of the voltage across the condenser 15 is no longer opposite to the phase of the voltage across the coil 10 and moreover the relative magnitudes of the two voltages become unequal. The losses of the circuit become relatively great, and the total phenomena may be described as a reduction in the Q of the resonant circuit. The voltage across the coil 10 is reduced by this reduction in Q, and the current in the series resonant circuit is reduced, reducing operating current to the relay coil 10. The relay coil 10 under these conditions permits the contacts 11 to open.

The effect of the thermistor 16 is to introduce a time delay. When the photo-conductive element 15 is illuminated, current flow through the photo-conductive element and through the thermistor 16 increases. This increase in current flow gradually heats the thermistor and correspondingly reduces its resistance, it having a negative temperature coefficient of resistance. Accordingly, although illumination of photo-conductive device 15 is accompanied by reduction of its resistance in an extremely short time, this reduction does not effect a sufficient reduction in the total resistance across the relay coil 10 to effect its de-energization, nor effect a sufficient reduction in the Q of the resonant circuit, to permit opening of the contacts 11. It follows that transient illumination of the photo-electric device 15 for a short period of time will not cause change of state of the relay, and that each change of state takes place only after a time delay sufficient to permit the thermistor 16 to change its resistance by a considerable amount.

Connected across the relay coil 10 is a source of illumination in the form of a small bulb 17. Utilization of a gaseous bulb, such as a neon cell, is preferred. Connected in shunt to the latter is a load device 18, which in a specific application of the present invention may be a bank of lamps, or one or more small lamps, designed for flasher operation, although we do not desire to be limited to any specific load.

The system including specifically the photo-conductive device 15 and the lamp 17 may be enclosed in a suitable enclosure 19. Should this enclosure be light-tight, operation of the system will be independent of ambient light conditions, i.e., whether the system is operating in daylight or in dark. However, an opening 20 may be provided through which the level of illumination exteriorly of the container 19 may affect the photo-conductive cell 15. In high level ambient light, then, the photo-conductive device 15 remains continually illuminated, and accordingly, the resonant circuit 15 remains continually damped or has a continuously low Q value, and the contacts 11 remain open. Upon attainment of dark conditions, however, cyclic operation of the relay initiates, ambient conditions having no effect on operation.

Accordingly, the description of cyclic operation is identical whether the enclosure 19 is completely enclosed or provides an opening for entrance of ambient light.

Describing now a cycle of operation of the present invention, we may assume the contacts 11 to be initially open, that the system is enclosed in a light-tight enclosure 19 and that voltage is applied to the line 13. The photo-conductive device 15 is then unilluminated, a high resistance subsists across the relay coil 10, the circuit comprising capacitor 14 and relay coil 10 is resonant and high current flows in the relay coil 10. Accordingly, the contacts 11 close. Closure of the contacts 11 provides operating voltage of the lamp 17, which illuminates. Illumination of the lamp 17 illuminates the photo-conductive device 15, which reduces its resistance to a low value. Considerable current now begins to flow through the thermistor 16 and through the photo-cell 15, heating the thermistor 16 and gradually reducing its resistance. After a lapse of sufficient time, the resistance of the thermistor 16 drops to a value such that the resonant circuit comprising capacitor 14 and relay coil 10 becomes damped, whereupon current flow through the relay coil 10 is decreased to a relatively low value and the contacts 11 open.

Immediately on opening of the contacts 11, the current supply circuit to the lamp 17 is interrupted, the photo-electric cell 15 becomes unilluminated, its resistance increases to an extremely high value and the resonant circuit becomes undamped, which causes the relay contacts 11 to re-close. Were the operation of the relay contacts 11 on re-closure to be substantially instantaneous the thermistor 16 would remain heated while the contacts 11 were open, and upon the next reclosure of the contacts 11 in response to energization of the relay coil 10 the cycling time of the system would be shortened. However, re-closure, as a practical matter, requires sufficient time that the thermistor cools appreciably in the interval, and therefore remains effective as a delay element.

Referring to Figure 2 of the drawings, the photo-conductive cell 15 and the thermistor 16 are shown connected in shunt to the condenser 14 rather than in shunt to the coil 10. The systems of Figures 1 and 2 are otherwise identical, and their operations are similar. The system of Figure 1, however, possesses the advantage that the photo-conductive cell 15 not only reduces the Q of the resonant circuit comprising condenser 14 and coil 10, but also by-passes some of the line current around the coil 10, thereby providing a double control effect.

In one practical embodiment of the invention, the Q of the resonant circuit was 2 at its highest level, so that the voltage across the coil equalled twice line voltage. With the photo-conductive cell 15 illuminated, the voltage across the coil dropped to approximately ⅓ line voltage. The capacitor 15 had a value of .5 microfarad and the resistance of the relay coil was 2.5 kilohms. For low resistance coils it is advisable to insert a protective resistance in series, to bring the total series resistance to approximately 2.5K.

While we have described and illustrated one specific embodiment of our invention, it will be clear that variations of the details of construction which are specifically illustrated and described may be resorted to without departing from the true spirit and scope of the invention as defined in the appended claims.

What I claim is:

1. A signalling system operative from an A.C. source of power, comprising a signalling device, a relay coil, a capacitive reactance connected in a series circuit with said relay coil across said A.C. source of power, said relay coil having inductive reactance at least approximately numerically equal to said capacitive reactance at the frequency of said A.C. source of power, said series circuit having a predetermined relatively high Q, means connected in shunt to one of said capacitive reactance and said relay coil, said last means comprising a variable impedance of the passive type and responsive to a signal provided by said signalling device for reducing its impedance and thereby said Q to a relatively low value, a pair of contacts operative associated with said relay coil, said contacts being normally closed while said Q is high and open while said Q is reduced, said contacts completing an energizing circuit for said signalling device.

2. The combination according to claim 1 wherein said variable impedance includes a photo-conductive device and wherein said signalling device is a source of light arranged to illuminate said photo-conductive device.

3. The combination according to claim 2 wherein is further provided a thermistor in series with said photo-conductive cell, said thermistor having a negative temperature coefficient of resistance.

4. The combination according to claim 3 wherein said variable impedance and said thermistor in series are connected directly across said coil.

5. The combination according to claim 2 wherein said variable impedance is connected directly across said relay coil.

6. In a light flashing system, a series resonant circuit including a relay coil as a resonant element, means comprising a photo-resistive device connected to said series resonant circuit for detuning said series resonant circuit when illuminated and for tuning said series resonant circuit when unilluminated, contacts associated with said relay coil, and a source of light positioned to illuminate said photo-conductive device, said source of light including a lamp in series with said contacts.

7. The combination according to claim 6 wherein said relay is arranged and adapted to make said contacts relatively rapidly and to break said contacts after a time delay.

8. The system according to claim 6 wherein is provided a thermistor in series with said photo-resistive device.

9. The system according to claim 5 wherein said photo-conductive device is connected directly across said relay coil.

10. In a flash system for operation from an A.C. power source of predetermined frequency, a relay coil having inductance, capacitive means connected in a series circuit with said relay coil and resonating therewith at said predetermined frequency, said series circuit being connected across said A.C. power source, contacts operatively associated with said relay coil, said contacts being arranged to close in response to relatively high current in said relay coil and to open in response to relatively low current in said relay coil, a photo-sensitive resistance connected in shunt to said relay coil only, and a lamp device connected to said A.C. power source in series with said contacts, said lamp source being positioned to illuminate said photo-sensitive resistance.

11. The combination according to claim 10 wherein is provided a thermistor having a negative temperature coefficient of resistance connected in series with said photo-conductive resistance in shunt to said relay coil.

12. In a flasher system for operation from an A.C. power source of predetermined frequency, a series resonant circuit connected to said power source, said series resonant circuit being resonant to said predetermined frequency, said series resonant circuit including a relay coil, a photo-conductive resistance connected in shunt only to said relay coil, means responsive to reduction of current in said relay coil for reducing illumination of said photo-conductive resistance and responsive to increase of current in said relay coil for increasing illumination of said photo-conductive resistance.

13. The combination according to claim 12 wherein said last mentioned means includes a lamp device and contacts in series with said lamp device, said contacts being arranged for closure in response to said increase of said current in said relay coil and for opening in response to said decrease of said current in said relay coil.

14. The combination in accordance with claim 13 wherein is provided means for delaying at least one of closure and opening of said contacts.

15. The combination according to claim 14 wherein said last means is a thermistor having a negative temperature coefficient of resistance connected in series with said photo-conductive resistance, in shunt only to said relay coil.

References Cited in the file of this patent

UNITED STATES PATENTS

| | | |
|---|---|---|
| Re. 17,766 | Jenkins | Aug. 12, 1930 |
| 1,704,360 | Jenkins | Mar. 5, 1929 |
| 2,273,537 | Rehder | Feb. 17, 1942 |
| 2,862,416 | Doyle | Dec. 2, 1958 |